Feb. 10, 1953 V. A. WILSON 2,627,674
INSTRUCTION APPARATUS FOR VEHICLE OPERATION
Filed Jan. 23, 1948 2 SHEETS—SHEET 1
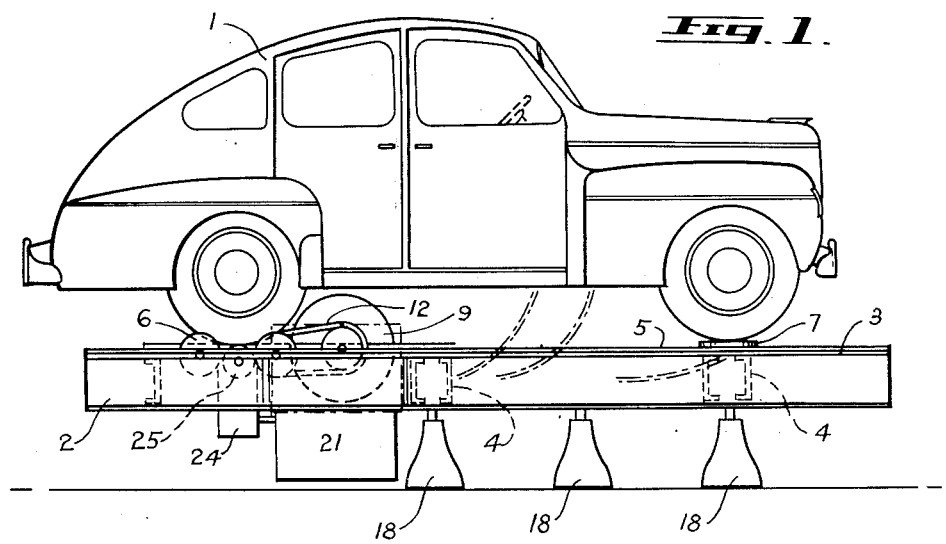
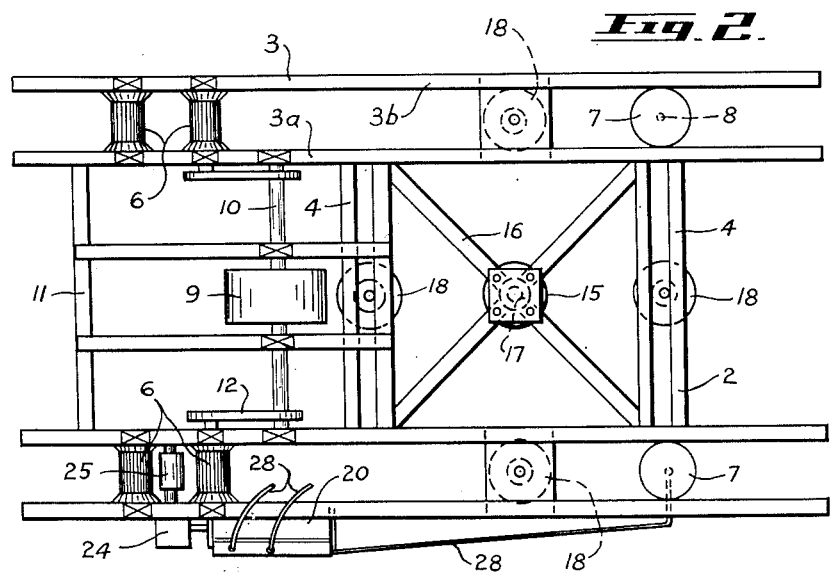
Inventor
VICTOR A. WILSON
by
W. Irwin Hackett
Attorney.

Feb. 10, 1953  V. A. WILSON  2,627,674
INSTRUCTION APPARATUS FOR VEHICLE OPERATION
Filed Jan. 23, 1948  2 SHEETS—SHEET 2
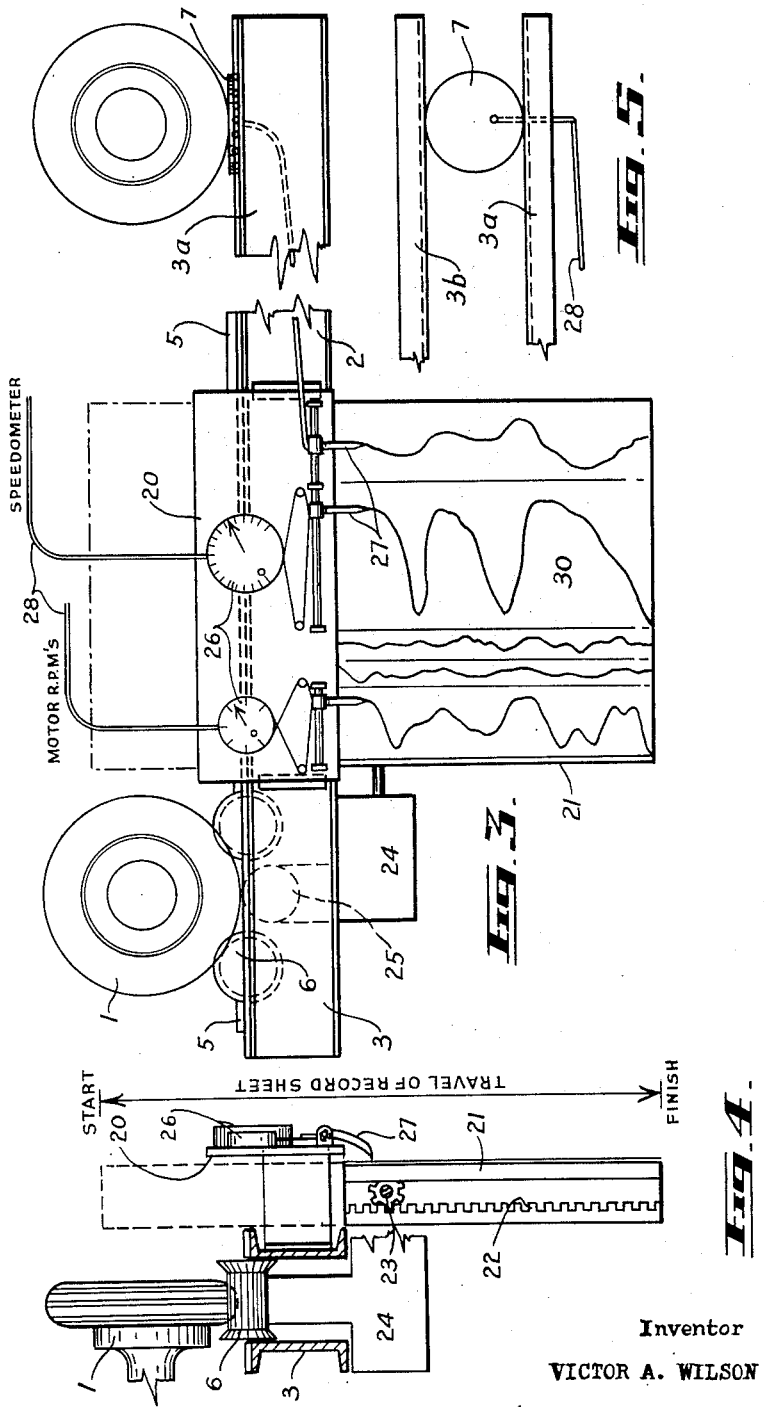
Inventor
VICTOR A. WILSON
by
W. Irvin Haskett
Attorney.

Patented Feb. 10, 1953

2,627,674

UNITED STATES PATENT OFFICE 2,627,674

INSTRUCTION APPARATUS FOR VEHICLE OPERATION

Victor A. Wilson, Toronto, Ontario, Canada

Application January 23, 1948, Serial No. 3,990

2 Claims. (Cl. 35—11)

This invention relates to new and useful improvements in an instructing apparatus and appertains particularly to a device for instructing and testing automobile drivers.

An object of the invention is to provide a treadmill type of machine on which a standard motor vehicle is mounted for operation in the usual way and in which all the operations normally encountered in road travel can be simulated in a most realistic way.

Another object of the invention is to provide an instructing and/or testing apparatus of the character wherein the complete performance of the driver operating the rack-supported vehicle is recorded on an action-synchronizing graph.

Another object of the invention is to provide a drivers' instruction and testing machine whereby intending vehicle operators may safely learn and practice all the acts of driving a car, under very real and realistically simulated road conditions before entering traffic and jeopardizing the lives and property of themselves and others.

Yet another object of the invention is the provision of an instructing, testing and recording apparatus for automobile drivers of simple, rugged and durable structure, that is safe and efficient in operation and highly useful in teaching and testing by providing a positive record of the driver's actual behavior at the wheel against a background of a prepared perfect performance chart.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like charactres indicate like parts throughout the several views.

In the drawings:

Figure 1 is a side elevation of a possible embodiment of my rack with a conventional car mounted thereon and some of the graph-recording connections shown in diagram;

Figure 2 is a plan view of such a rack, with the tread plates removed;

Figure 3 is an enlarged, diagrammatic side elevation of the recording graph and associated mechanism;

Figure 4 is a rear sectional-elevation thereof; and

Figure 5 is an enlarged plan view of one of the front, steering-wheel supporting disks in the rack frame.

In carrying out this invention, I position an automobile 1 of conventional design on a treadmill type of supporting rack 2 comprising a pair of wheel tracks 3 laterally spaced and rigidified by transverse girders or braces 4. The tracks are each composed of a pair of U-girders 3a and 3b sufficiently separated to provide a safe width and with their flanges facing away from one another. A superposed tread plate 5 bridges each pair of track girders and may be permanently secured in place or just temporarily positioned when mounting or removing the vehicle 1. These plates will be clearly seen in Figures 1, 3 and 4: Figures 2 and 5 show the track girders with the tread plates removed.

A pair of spaced rotatable tread rollers 6, to support the drive wheels of the car 1, are mounted across between each of the track girders 3a and 3b near the rear end of the rack 2 while a front wheel-supporting disk 7 turnable on a central vertical pivot 8 is provided near the forward end of each track. Thus a student operator at the wheel of the automobile 1 may safely drive and steer the car without displacing it from the treadmill rack 2.

A device representing approximately the load of the car, with which an operator must become familiar when starting and stopping, is supplied in the form of a fly wheel 9 rotatably on a shaft 10 supported in a supplementary frame 11, lying behind the rearmost transverse brace 4. Gear-carried endless chains 12 connect the foremost tread roller 6 of each pair of this fly wheel shaft 10 so giving a load against which the car motor must pull in starting and a momentum usable when shifting gears and against which the brakes must be applied in decelerating.

The whole car supporting rack 2 I mount firstly on a ball-topped post 15 disposed directly beneath the centre of gravity point of the said rack when loaded with an automobile and on which said rack may freely teeter in any direction; the rack having a spider-like supporting frame 16 within its spaced tracks 3 and cross braces 4 on the under side of which a concaved socket plate 17 is carried to rest on the said ball-topped post 15. The secondary supporting medium for the rack consists of four hydraulic or other adjustable jacks 18, one pair being under the opposite tracks 3 in transverse alignment with said post and the other pair being under the cross braces 4, one on either side of and in longitudinal alignment with said post. A synchronizing control, not shown, is employed to drop one jack as the other of the pair is raised thus causing the rack and car supported thereon to tip to either side or pitch lengthwise. The four jacks alone could accomplish the same purpose but I prefer to employ also the center universal pivot post as a safety factor and, by carrying on it the major part of the weight of the carloaded rack, find the rack more responsive to the synchronized action of the jacks, which latter may also be of lighter and cheaper construction.

The apparatus herein shown and described provides a student driver with an opportunity to familiarize himself with most all the conditions normally encountered in operating the vehicle on the road, in complete safety and unharrassed by traffic. It is proposed to screen a road or highway moving picture in view of the operator of this rack-supported automobile for purposes of instruction and subsequent testing and to simulate the conditions of the road depicted on the screen by tilting the rack accordingly.

A performance recording device 20 is mounted on the rack 2 and includes a movable record sheet panel 21, operable by one of the drive wheels of the automobile 1, having a rack 22 engaged by a gear wheel 23 driven through the gear box 24 which is operated by a wheel driven friction roller 25 disposed transversely within a pair of track girders 3a and 3b and positioned intermediate a pair of the tread wheels 6. Thus the record panel is progressively advanced when the car's drive wheels are in motion.

A plurality of recording instruments 26 with suitable record sheet stylus markers 27 are mounted in spaced relation on the instrument panel board and provided with conventional connections 28 reaching to the various parts of the car's or rack's mechanisms such as the motor R. P. M. counter, the speedometer, the rack's rotatable front wheel steering disks and the like. In this way an accurate and complete graph-like record 30 is made of the driver's performance, this can be superimposed on or compared with a prepared "perfect performance" graph of the highway route travelled, according to the screened movie. The short comings and failures of the driver are thus easily detected whether for instruction or in testing.

From the foregoing description taken in connection with the accompanying drawings, it will be manifest that an instructing apparatus is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new and desire to secure by Letters Patent is:

1. The combination with means for supporting a motor vehicle in a stationary position while permitting rotation of the drive wheels and steering movements of the steering wheels, of means for feeding a record strip longitudinally at one side of said supporting means, a steering marker and a speed marker in cooperative relation with the record strip, means for actuating the steering marker having means for connection with a steerable wheel to be actuated to impart the steering movements thereof to the steering marker, and other means for operating the speed marker and provided with means for connection with a drive wheel of an automobile mounted on the support.

2. For an instructing and testing apparatus as set forth in claim 1 a performance recording device mounted on one of the tracks of said rack and comprising a drivable, meshing rack and pinion operated record sheet panel and operating means therefor for frictional engagement by the drive wheel of an automobile mounted on said rack.

VICTOR A. WILSON.

REFERENCES CITED

The following references are of record in the file of this patent:

UNITED STATES PATENTS

| Number | Name | Date |
|---|---|---|
| 1,161,920 | Bishop | Nov. 3, 1915 |
| 1,564,138 | Rowland | Dec. 1, 1925 |
| 1,789,680 | Gwinnett | Jan. 20, 1931 |
| 1,825,462 | Link | Sept. 29, 1931 |
| 1,894,405 | Langbein | Jan. 17, 1933 |
| 2,055,430 | Feragen | Sept. 22, 1936 |
| 2,091,154 | Matzner | Aug. 24, 1937 |
| 2,149,440 | Jackson | Mar. 7, 1939 |
| 2,269,444 | Durham et al. | Jan. 13, 1942 |
| 2,353,213 | Bennett | July 11, 1944 |